US008924012B2

(12) United States Patent
Chaika

(10) Patent No.: US 8,924,012 B2
(45) Date of Patent: Dec. 30, 2014

(54) ELECTRO-HYDRAULIC INTERACTIVE DOUBLE FEEDBACK LOOP

(71) Applicant: Marvel Tech Inc., Edmonton (CA)

(72) Inventor: Darin J. Chaika, Edmonton (CA)

(73) Assignee: Marvel Tech Inc., Edmonton (CA)

( * ) Notice: Subject to any disclaimer, the term of this patent is extended or adjusted under 35 U.S.C. 154(b) by 0 days.

(21) Appl. No.: 13/980,578

(22) PCT Filed: Jan. 7, 2013

(86) PCT No.: PCT/CA2013/000007
§ 371 (c)(1),
(2), (4) Date: Jul. 19, 2013

(87) PCT Pub. No.: WO2013/102270
PCT Pub. Date: Jul. 11, 2013

(65) Prior Publication Data
US 2014/0076440 A1    Mar. 20, 2014

Related U.S. Application Data

(60) Provisional application No. 61/584,103, filed on Jan. 6, 2012.

(51) Int. Cl.
| | | |
|---|---|---|
| *F15B 13/14* | (2006.01) | |
| *F15B 9/17* | (2006.01) | |
| *F17D 3/01* | (2006.01) | |
| *B25J 3/00* | (2006.01) | |
| *G09B 9/00* | (2006.01) | |

(52) U.S. Cl.
CPC ... *F17D 3/01* (2013.01); *F51B 9/09* (2013.01); *G09B 9/00* (2013.01); *G09B 9/003* (2013.01); *G09B 9/006* (2013.01); *F15B 2211/30575* (2013.01); *F15B 2211/3127* (2013.01); *F15B 2211/50536* (2013.01); *F15B 2211/513* (2013.01); *F15B 2211/6309* (2013.01); *F15B 2211/6336* (2013.01); *F15B 2211/6656* (2013.01); *F15B 2211/7054* (2013.01); *Y10S 901/50* (2013.01)
USPC ............................................ 700/245; 901/50

(58) Field of Classification Search
CPC .................................................... G06F 2203/12
USPC ................................................... 700/245–264
See application file for complete search history.

(56) References Cited

U.S. PATENT DOCUMENTS

| | | | |
|---|---|---|---|
| 3,168,203 A | 2/1965 | Gallistel | |
| 3,241,687 A | 3/1966 | Orloff | |

(Continued)

OTHER PUBLICATIONS

Written Opinion of the International Searching Authority dated Mar. 14, 2013 re PCT/CA2013/000007.

*Primary Examiner* — Khoi Tran
*Assistant Examiner* — Dale Moyer
(74) *Attorney, Agent, or Firm* — Donald V. Tomkins

(57) ABSTRACT

An electro-hydraulic circuit enabling two mechanical devices to shadow each other's movements without any direct mechanically-operative linkage between the devices. The two devices incorporate matching sets of hydraulic actuators for inducing movements of movable components of the devices. For each actuator in a given one of the devices, a system of electronic sensors and hydraulic valves, in conjunction with a central processing and control system, keeps track of the physical positions and configurations of the actuator and the corresponding actuator in the other device, and what the status of the actuators should be in relation to each other. If an actuator associated with one device is moved by an external force, a corresponding actuator in the other device moves in response to that external force, with proportionate direction, speed, and force.

13 Claims, 3 Drawing Sheets

(56) References Cited

U.S. PATENT DOCUMENTS

| | | |
|---|---|---|
| 3,712,180 A | 1/1973 | Pieper |
| 4,151,785 A | 5/1979 | Koschek |
| 4,394,102 A | 7/1983 | Batchelder et al. |
| 4,893,981 A | 1/1990 | Yoshinada et al. |
| 5,073,091 A | 12/1991 | Burgess et al. |
| 5,568,022 A | 10/1996 | Tranovich |
| 6,457,487 B1 * | 10/2002 | Stephenson et al. ..... 137/596.16 |
| 6,508,058 B1 | 1/2003 | Seaverson |
| 7,284,374 B2 | 10/2007 | Buerger et al. |
| 7,487,707 B2 | 2/2009 | Pfaff et al. |
| 7,628,766 B1 * | 12/2009 | Kazerooni et al. .............. 602/16 |
| 7,874,152 B2 | 1/2011 | Pfaff |
| 7,926,269 B2 | 4/2011 | Buerger et al. |
| 2008/0109108 A1 | 5/2008 | Lawson |
| 2008/0216645 A1 * | 9/2008 | Jacobsen et al. ................. 91/471 |
| 2010/0107864 A1 * | 5/2010 | Bushner ......................... 91/422 |
| 2011/0187065 A1 * | 8/2011 | Van Der Knaap et al. . 280/5.507 |

* cited by examiner

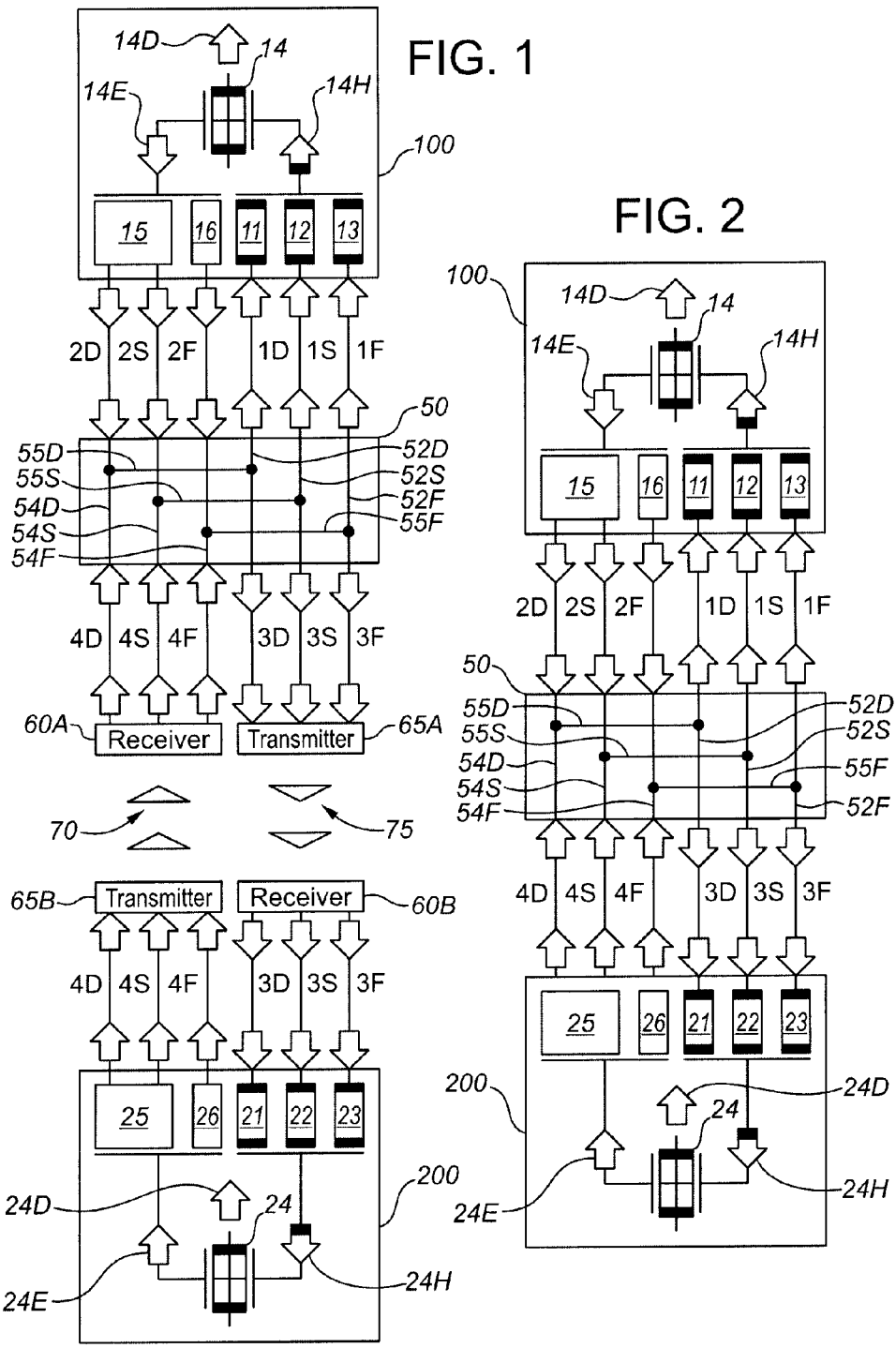

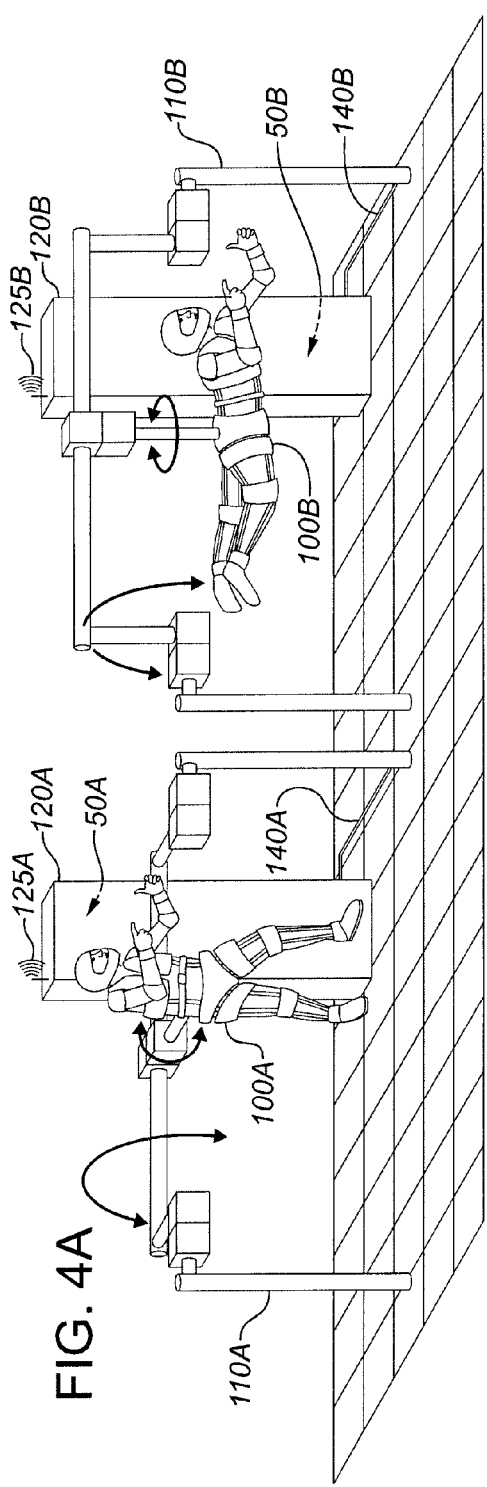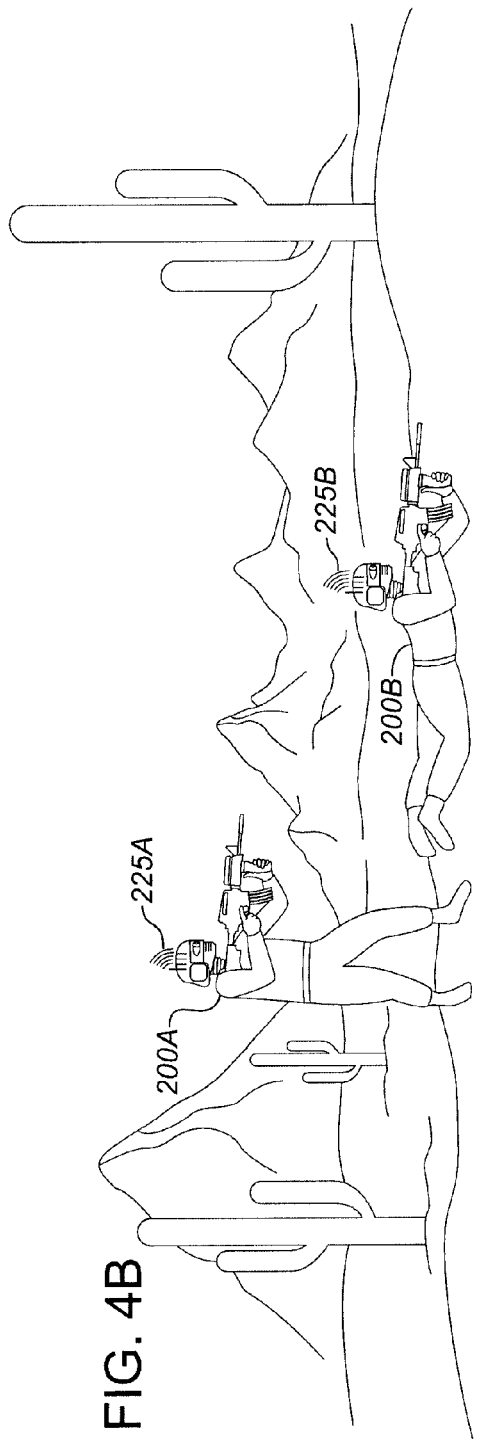

ELECTRO-HYDRAULIC INTERACTIVE DOUBLE FEEDBACK LOOP

FIELD OF THE DISCLOSURE

The present disclosure relates to systems and methods for controlling the movements of remotely operating machines or apparatus, including but not limited to remotely operating machines of humanoid or quasi-humanoid configuration.

BRIEF SUMMARY

In general terms, the present disclosure teaches embodiments of an electro-hydraulic circuit or system enabling two or more devices, both of which have movable components capable of one or more matching modes of movement, to shadow or mimic each other's movements, in terms of direction, speed, and mode of movement or movements, and also in terms of forces inducing such movements, but without any direct physical or mechanically-operative linkage or connection between the devices. By way of non-limiting example, the devices or component parts of the devices could be capable of linear modes of movements or rotational modes of movements.

In broad terms, electro-hydraulic circuits or systems in accordance with the present disclosure convert the physical movements of a first device into digital signals, which are then conveyed to a complementary or matching second device which effectively reintegrates the digital signals to replicate the movements of the first device in the second device, in very close to real time. Moreover, such operations occur reciprocally and simultaneously, with movements of the second device also being digitized and then replicated in the first device. In view of this reciprocal or sympathetic interaction between the two devices, electro-hydraulic circuits or systems in accordance with the present disclosure may be alternatively referred to as interactive double feedback loops (or interactive double feedback circuits).

One basic embodiment of an interactive double feedback loop in accordance with the present disclosure comprises two devices that are each equipped with or associated with respective complementary hydraulic valve and sensor systems. Each device has one or more actuators for causing or inducing movements of particular movable components of the device, with each device's associated hydraulic valve and sensor systems controlling the operation of the actuators in conjunction with a central processing and control unit (also referred to herein as the "central control unit") operably linked to the hydraulic valve and sensor systems of both devices. In preferred embodiments, the sensor systems are capable of detecting the direction, speed, and mode of movements produced by each actuator, as well as the magnitude, orientation, and type of forces, pressures, and moments applied to the devices by external agencies.

In preferred embodiments, each actuator is provided with a dedicated hydraulic valve and sensor system, to optimize independence of operation of each actuator. However, alternative embodiments are conceivable in which a single hydraulic valve and sensor system controls two or more actuators in a given device.

Each actuator in each device is adapted to produce a particular type of movement, which could take any of many different forms. For example, a humanoid device might have components analogous to fingers, hands, arms, legs, and feet, in order for the device as a whole to be capable of movements analogous to human movements of gripping (by means of the device's analog fingers and hands), lifting (by means of analog arms), and walking (by means of analog legs and feet). An actuator would be provided for each desired movement capability, such as the ability to raise an analog arm, to bend an analog knee or elbow, or to swivel an analog head. By way of non-limiting example, one embodiment of a humanoid device might have somewhere in the range of fifty actuators to provide a desired set of movement capabilities to suit a specific practical application. Other devices might have more or fewer actuators, depending on the devices' intended uses. Some devices (including certain humanoid devices) may be adapted to allow spatial movement of the devices (for example, to walk or to climb stairs), while other devices may be spatially stationary while being capable of a variety of different types of movements (for example, to manipulate objects or machinery).

The central control unit (or "CCU") is in either wired or wireless electronic communication (or a combination of wired and wireless electronic communication) with both devices. The CCU receives electronic signals from the sensor systems associated with each of the devices. When the CCU receives a signal indicating a particular movement of a particular actuator in a first one of the two devices, it transmits electronic signals to the corresponding hydraulic valve systems of the second device causing actuation of the corresponding actuators of the second device to produce corresponding movements in terms of direction, speed, mode, and force of movements, such that all movements of the two devices and their various components are synchronized in close to real time.

In a typical operational scenario, the two devices start at rest, with their various movable components being able to move freely if acted upon by an external force. If an external force causes a movement of one movable component of the first device—which in turn causes movement of a given one of the first device's actuators—the associated sensor system gathers information pertaining to that movement (e.g., direction, speed, force) and sends it to the CCU via one or more data links. The CCU transmits this information to the complementary hydraulic valve system of the second device, causing the complementary actuator in the second device to move in the same manner as the complementary actuator in the first device, such that it experiences the same externally-applied forces acting on the actuator in the first device.

If complementary actuators in the two devices experience separate external forces at the same time, the CCU detects and distinguishes the separate external forces and then directs each actuator to act or move in a manner corresponding to what its "partner" actuator is experiencing. In this scenario, the combining of both external forces will ultimately determine the direction, speed, and force of both actuators as a pair. This constant and virtually instant monitoring of all external force inputs, coupled with constant and virtually instant control of both actuators in response to external force inputs, creates a reciprocal actuator shadowing effect, or interactive double feedback loop.

In practical operational scenarios, the CCU will be constantly receiving and transmitting signals from a large number and at times all of the actuators associated with the devices. In various embodiments, many or all of the actuators may take the form of double-acting hydraulic cylinders, capable of linear movements only. The range and fluidity of movements that a given movable component of a device is capable of providing may depend on the number and type of actuators affecting the movement of that component and how many different modes of movement it can produce or experience. For example, an analog arm could be affected by several actuators to produce combined movements (for example, movements analogous to bending at the elbow while rotating at the shoulder joint).

The CCU is programmed to simultaneously process sensor data relating to all such combined movements so that they can be replicated in the partner device in real time. The CCU incorporates one or more processors and one or more memories as appropriate to carry out the necessary computational, control, and data communication functions. Development of software necessary to perform these operations will be within the capabilities of persons of ordinary skill in the computer programming art.

BRIEF DESCRIPTION OF THE DRAWINGS

Embodiments in accordance with the present disclosure will now be described with reference to the accompanying Figures, in which numerical references denote like parts, and in which:

FIG. 1 is a schematic illustration of one embodiment of an interactive double feedback loop incorporating a pair of actuators in the form of double-acting hydraulic cylinders, with each actuator having an associated hydraulic valve and sensor system in either wireless or hard-wired electronic communication with a central control unit.

FIG. 2 is a schematic illustration of a variant of the interactive double feedback loop in FIG. 1, with both hydraulic valve and sensor systems in hard-wired electronic communication with the central control unit.

FIGS. 4A and 4B conceptually illustrate one possible practical application for devices incorporating interactive double feedback loops in accordance with the present disclosure.

DETAILED DESCRIPTION

FIGS. 1, 2, 3A, and 3B illustrate one non-limiting embodiment of an electro-hydraulic control system providing an interactive double feedback loop in accordance with the present disclosure. The illustrated system comprises a first actuator 14, a second actuator 24, and a central processing and control unit ("CCU") 50. In FIGS. 1, 2, 3A, and 3B, components having two-digit reference numbers prefixed with a "1" or a "3" are associated with actuator 14, while components having two-digit reference numbers prefixed with a "2" or a "4" are associated with actuator 24 (as will be clearer from the description that follows).

Figure 3A:
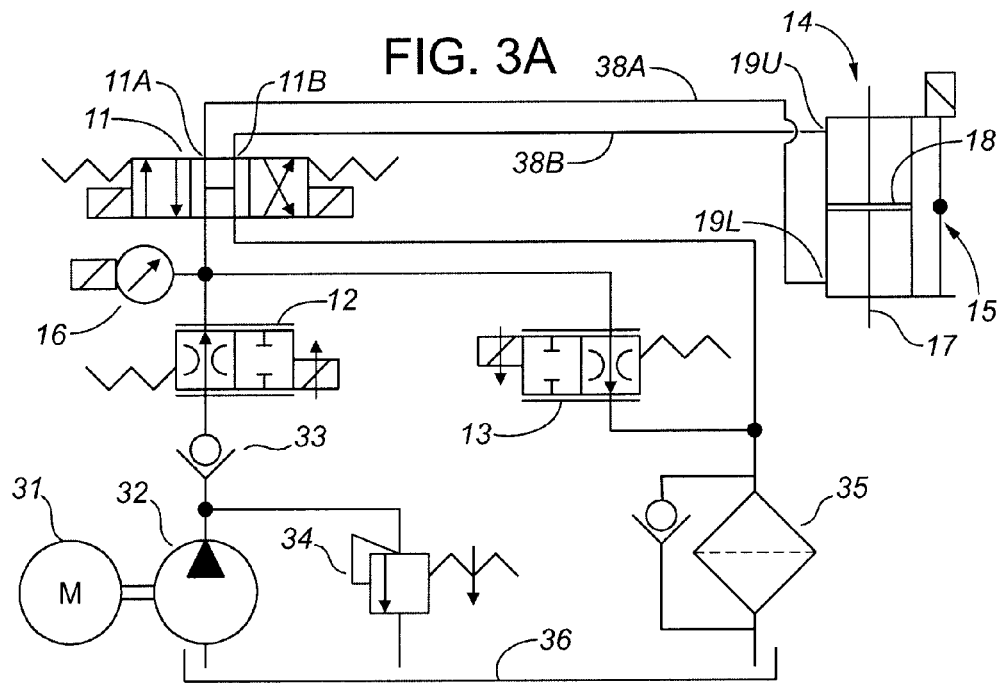
FIGS. 3A and 3B are schematic drawings of an exemplary electro-hydraulic circuit for initiating and controlling actuator movements in accordance with an interactive double feedback loop as in FIG. 1 or FIG. 2.
Figure 3B:
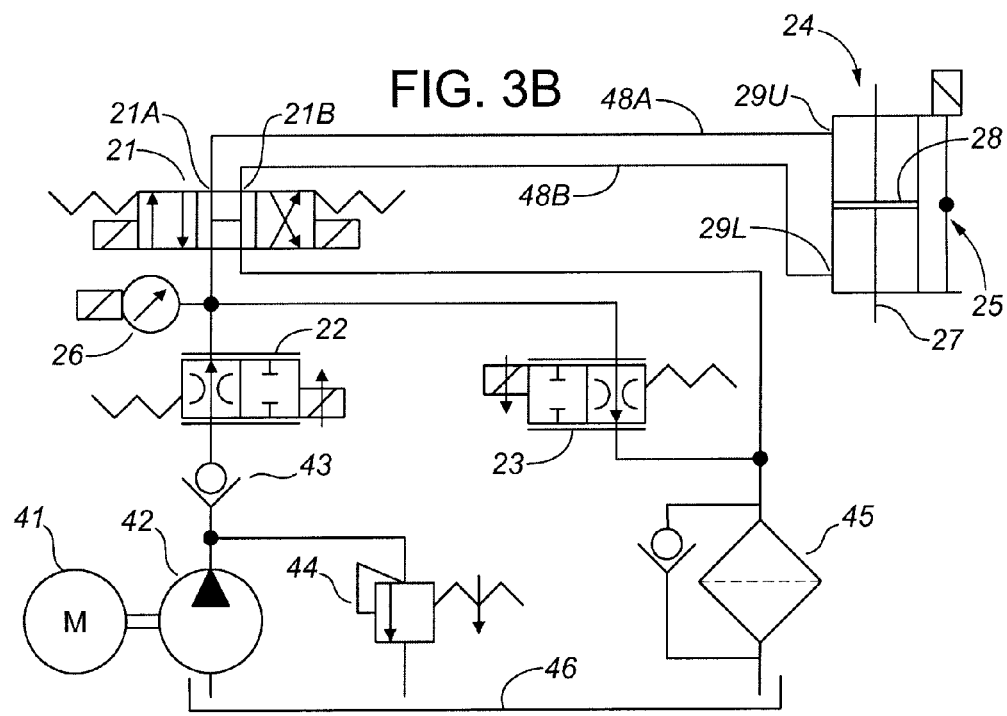

The hydraulic schematics in FIGS. 3A and 3B use standard symbols that will be understood by persons skilled in the art, but brief descriptions of the components illustrated in FIGS. 3A and 3B are set out below for convenient reference:

- 11, 21 3-position, 4-way, open-center, spring-centered, solenoid-operated directional control valves, having respective work A-ports 11A, 21A and work B-ports 11B, 21B ("work A-port" and "work B-port" being terms readily understood by persons skilled in the art of hydraulics and directional control valves)
- 12, 22 Normally open, proportional, solenoid-operated flow control valves
- 13, 23 Normally open, proportional, solenoid-operated flow control valves
- 14, 24 Actuators—illustrated by way of example in the form of double-rod, double-acting cylinders, having respective piston rods 17, 27, pistons 18, 28, upper fluid inlet ports 19U, 29U, and lower fluid inlet ports 19L, 29L (in this context, the adjectives "upper" and "lower" are used arbitrarily for comparative reference, and do not denote or suggest any particular spatial position or orientation of the actuators)
- 15, 25 Rod motion sensors providing data read-back with respect to the positions of piston rods 17, 27
- 16, 26 Pressure sensors (transducers)
- 31, 41 Prime movers; e.g., electric motor or gas engine (each of which may serve one or more hydraulic pumps)
- 32, 42 Fixed displacement hydraulic pumps (each of which may serve one or more actuators)
- 33, 43 Check valves
- 34, 44 Pressure relief valves
- 35, 45 Return filters with reverse-flow check valves (each of which filters may serve one or more actuators)
- 36, 46 Hydraulic fluid reservoirs (each of which may serve one or more actuators)
- 38A, 48A Hydraulic lines from work A-ports 11A, 21A to actuators 14, 24
- 38B, 48B Hydraulic lines from work B-ports 11B, 21B to actuators 14, 24

It will be noted that FIGS. 3A and 3B are essentially identical except for the routing of hydraulic lines 38A, 48A, 38B, and 48B.

It is also to be appreciated that the hydraulic schematics in FIGS. 3A and 3B are exemplary only, and not intended to suggest applicability in all respects to alternative embodiments of interactive double feedback loops in accordance with the disclosure.

In FIGS. 1 and 2, reference numbers 100 and 200 denote first and second machines or devices incorporating actuators and associated hydraulic valve and sensor systems. For the sake of simplicity, FIGS. 1 and 2 show devices 100 and 200 as each incorporating only one actuator 14 or 24 and their associated hydraulic valve and sensor systems. However, it is to be understood that devices 100 and 200 may (and in most practical applications will) incorporate multiple actuators and associated hydraulic valve and sensor systems.

In the illustrated embodiment, each actuator 14 or 24 comprises a double-rod, double-acting cylinder with an associated rod motion sensor 15 or 25. However, these are by way of non-limiting example only, and they are not to be interpreted so as to restrict the types of actuators that can be used in electro-hydraulic control systems accordance with the present disclosure or to otherwise limit the scope of the disclosure. As used in the field of hydraulics, and as intended to be understood for purposes of this patent document, the term "actuator" generally denotes any component that converts energy (such as hydraulic energy) into mechanical energy, and actuators in accordance with this definition can take a variety of forms. Other known types of actuators include hydraulic motors, rotary actuators, hydraulic cylinders, and hydraulic rams. Some actuators convert hydraulic energy into rotational energy (e.g., hydraulic motors and rotary actuators), and some convert hydraulic energy into linear energy (e.g., hydraulic cylinders and hydraulic rams).

In embodiments using double-acting hydraulic cylinders as actuators, it may be functionally advantageous to use double-rod cylinders as in the illustrated embodiments. However, alternative embodiments may incorporate actuators in the form of single-rod, double-acting cylinders; double-rod, single-acting cylinders; single-rod, single-acting cylinders; or combinations of two or more of these four different types of hydraulic cylinders.

It should also be noted that interactive double feedback loops in accordance with the present disclosure could also incorporate pneumatic cylinders (particularly for the performance of functions requiring generation of comparatively small forces only, such that compressibility of the gas used in the pneumatic cylinders will not give rise to operational problems).

Referring again to FIGS. 1, 2, 3A, and 313, CCU 50 receives data from rod motion sensors 15, 25 indicating the direction (via data links 2D, 4D) and speed (via data links 2S, 4S) of movement of actuators 14, 24. It should be noted in this regard that while FIGS. 1 and 2 indicate separate data links for signals relating to actuator direction and speed, this is purely for conceptual illustration, to indicate that both direction and speed are being determined (by CCU 50). As a matter of practical fact, each of rod motion sensors 15, 25 will send a single data signal to CCU 50, indicating actuator position at a given instant. However, since CCU 50 will incorporate clock means, it is a simple matter for CCU 50 to calculate instantaneous actuator speeds based on the stream of actuator position data that CCU 50 receives from rod motion sensors 15, 25.

CCU 50 also receives data from hydraulic pressure transducers 16, 26 (via data links 2F, 4F), thus enabling CCU 50 to calculate forces generated by movements of actuators 14, 24.

It can be seen, therefore, that the flow of data from rod motion sensors 15, 25 and pressure transducers 16, 26 enables CCU 50 to determine the status of actuators 14 and 24 relative to each other, and on a continuous basis.

CCU 50 also transmits control signals to:
directional control valves 11, 21 (via data links 1D, 3D) to govern the Direction of movements of actuators 14, 24;
proportional flow control valves 12, 22 (via data links 1S, 3S) to govern the Speed of movements of actuators 14, 24; and
proportional flow control valves 13, 23 (via data links 1F, 3F) to govern the Force exerted by movements of actuators 14, 24;
so as to direct actuators 14 and 24 to shadow each other in terms of direction, speed, and force.

Actuators 14 and 24 start at rest, with the ability to move freely if acted upon by an external force. When one of actuators 14, 24 is acted by an external force, CCU 50 determines which of actuators 14, 24 is to be considered the "primary" actuator; i.e., the actuator that is first to be moved in response to the application of an external force. For example, if actuator 14 is moved first, then CCU 50 considers actuator 14 to be the primary actuator, and considers actuator 24 to be the "secondary" actuator, for specific purposes of the system's response to the specific applied external force.

CCU 50 then sends signals to the secondary actuator (actuator 24 in this example) to move in a manner mimicking the movements of the primary actuator (actuator 14 in the example). This is done by signaling the directional control valve (21) associated with the secondary actuator (24) to move or manipulate the secondary actuator (24) in the same manner as the primary actuator (14) is being moved or manipulated by the applied external force (i.e., in terms of direction, speed, and force of movement), and signaling the associated proportional flow control (22) to move or manipulate the secondary actuator (24) so as to "catch up to" and match the movements of the primary actuator (14), in as close to real time as possible.

At the same time, CCU 50 also sends signals to the primary actuator (14), causing it to resist the external force acting on it and to move back to a position corresponding to the current position of the secondary actuator (24). This is done by signaling the directional control valve (11) associated with the primary actuator (14) to move the primary actuator (14) in a direction opposite to the direction in which the secondary actuator (24) has been signaled to move, and signaling the proportional flow control (12) associated with the primary actuator (14) to move the primary actuator (14) at maximum speed to attain a position corresponding to the position of the secondary actuator (24), in as close to real time as possible.

If an external force resists the movement of the secondary actuator (24), CCU 50 will generate an opposing force (or forces) acting on the primary actuator (14) equal to the external force(s) acting on the secondary actuator (24), and will also generate an opposing force (or forces) acting on the secondary actuator (24) corresponding to the external force(s) acting on the primary actuator (14). This is done by signaling the proportional flow control (23) associated with the secondary actuator (24) to close just enough to generate a line pressure equal to the line pressure sensed from the hydraulic pressure sensor (16) associated with the primary actuator (14), and by signaling the proportional flow control (13) associated with the primary actuator (14) to close just enough to generate a line pressure equal to that of the line pressure sensed from the hydraulic pressure sensor (26) associated with the secondary actuator (24).

Thus, the primary actuator (14) now resists the external force placed upon it with a force generated by CCU 50 equal to the external force placed on the secondary actuator (24). At the same time, the secondary actuator (24) now resists the external force applied to it with a force generated by CCU 50 equal to the external force applied to the primary actuator (14). Both actuators will ultimately move in sympathetic fashion in response to the net effects of the primary and secondary external forces, as one net movement in terms of direction, mode, speed, and force.

This interactive operational relationship between the actuators will remain in effect until there are no more external forces acting on either the primary actuator (14) or the secondary actuator (24). At that point, neither actuator is considered to be the primary or secondary actuator; they are both simply at rest until another external force moves or manipulates one of the actuators and thus makes that actuator the primary actuator for purposes of the next series of movements or manipulations.

Accordingly, the role of primary or secondary actuator is relative, and will change depending on which actuator is first to experience an externally-applied actuating force. In fact, in situations where both actuators is subjected to externally-applied forces at the same time, each actuator will simultaneously be considered by the CCU as both the primary actuator in the context of external force acting on it, and the secondary actuator in the context of the external force acting on the other actuator. The CCU always sets the two actuators to oppose each other in movement, setting up a state in which each actuator reacts to the net direction, mode, speed, and magnitude of multiple externally-applied forces acting on the set of actuators in the corresponding device. The faster the central processing component's software allows the decisions to be made, the more seamless (and closer to "real time") the shadowing effect between the actuators will be.

As illustrated in FIG. 1, various data transfer links (1D, 1S, 1F; 2D, 2S, 2F; 3D, 3S, 3F; 4D, 4S, and 4F), transmitters (65A, 65B), and receivers (60A, 60B) function to transfer electronic data from the actuator sensors (15, 16; 25, 26) to CCU 50, and from CCU 50 to the actuator valves (11, 12, 13; 21, 22, 23) as schematically illustrated in FIGS. 3A and 3B. More specifically:

Directional control valves 11, 21 control the Direction that actuators 14, 24 move, in accordance with instructions received from CCU 50 via data transfer links 1D, 3D, respectively;

Proportional flow control valves 12, 22 control the Speed at which actuators 14, 24 move, in accordance with instructions received from CCU 50 via data transfer links 1S and 3S; and Proportional flow control valves 13, 23 control the Force acting on actuators 14, 24, in accordance with instructions received from CCU 50 via data transfer links 1F and 3F;

CCU 50 is kept continuously informed as to the current states of actuators 14, 24 by signals received from the associated sensors, as follows:

Rod motion sensors 15, 25 send signals to CCU 50 via data transfer links 2D, 4D indicating the Direction of movement of actuators 14, 24, and further send signals to CCU 50 via data transfer links 2S, 4S indicating the Speed of movement of actuators 14, 24; and Hydraulic pressure sensors 16, 26 send signals to CCU 50 via data transfer links 2F, 4F whereby CCU 50 can determine the magnitude of resisting Force being experienced by actuators 14, 24.

Software in CCU 50 constantly monitors the spatial position, orientation, and configuration of each actuator, as well as comparing each actuator's spatial position, orientation, and configuration relative to the other actuator. CCU 50 then determines which actuator needs to move—and in which direction, at what speed, and with the application of what force(s)—in order to bring it back into balance with the other actuator, based on the external forces acting upon the actuators.

It is to be noted that CCU 50 is not linked to any joysticks or other input devices. The only inputs that CCU 50 receives are from rod motion sensors 15, 25 and hydraulic pressure sensors 16, 26.

As conceptually shown in FIGS. 1 and 2, data transfer links 10 and 3D are linked within CCU 50 by a data link 52D. Similarly:

data links 1S and 3S are linked by a data link 52S;
data links 1F and 3F are linked by a data link 52F;
data links 2D and 4D are linked by a data link 54D;
data links 2S and 4S are linked by a data link 54S; and
data links 2F and 4F are linked by a data link 54F.

In addition, data links 52D and 54D are in communication with each other via a data link 550; data links 52S and 54S are in communication via a data link 55S; and data links 52F and 54F are in communication via a data link 55F.

The graphical representations in FIGS. 1 and 2 of the above-mentioned data links within CCU 50 are conceptual only. They do not necessarily denote discrete physical links (such as by hard wiring); rather, they are intended to indicate the various data flow paths as described conceptually in FIGS. 1 and 2, which can be provided in various ways within CCU 50, in accordance with the knowledge of persons skilled in the art.

For readily apparent reasons, data links 55D, 55S, and 55F are fundamental to interactive double feedback systems in accordance with the present disclosure, as there must be simultaneous two-way communication between each matching or complementary pair of actuators 14, 24 in their respective devices 100, 200 in order for the actuators to mimic each other's movements in real time. For a given feedback loop incorporating two actuators to be a "double interactive" feedback loop, the operation of each actuator must take into consideration and be influenced by the status of the other actuator, on a continuous and simultaneous basis. Accordingly, CCU 50 must manipulate actuator 14 based on data received from sensors 25, 26 as well as data received from sensors 15, 16, and must manipulate actuator 24 based on data received from sensors 15, 16 as well as data received from sensors 25, 26.

In the embodiment shown in FIG. 1, data links 3D, 3S, and 3F incorporate a wireless data link 75 whereby transmitter 65A transmits signals from CCU 50 to a receiver 60B associated with device 200. Similarly, data links 4D, 4S, and 4F incorporate a wireless link 70 whereby transmitter 65B transmits signals from sensors 25 and 26 to CCU 50 to a receiver 60A associated with CCU 50. However, this is by way of example only. In alternative embodiments, data links 3D, 3S, and 3F and/or data links 4D, 4S, and 4F could incorporate wireless data links, or, as shown in FIG. 2, all data links could be hard-wired.

Further reference may be made to FIGS. 1 and 2 for a more detailed understanding of the operation of an interactive double feedback loop in accordance with the present disclosure. In FIGS. 1 and 2, arrow 14D denotes movement of rod 17 and piston 18 of actuator 14 in a first direction (arbitrarily indicated as "up" on the page). This movement could be in response to an external force applied to first device 100. The direction ("up"), speed, and force of this movement are electronically detected by rod motion sensor 15 and pressure transducer 16 (as conceptually denoted by electronic signal arrow 14E), which send corresponding direction, speed, and force data to CCU 50 via data links 2D, 2S, and 2F. This information is processed by CCU 50, which then sends corresponding instruction/control signals to directional control valve 21 and proportional flow control valves 22 and 23 associated with second device 200, which in turn send a "hydraulic instruction/control signal" (conceptually denoted by arrow 24H) to actuator 24, causing it to replicate or mimic the movement of actuator 14 in terms of direction, speed, and force. It will be understood, of course, that prime mover 41 and hydraulic motor 42 will be operative at all times, such that adjustment of directional control valve 21 and proportional flow control valves 22 and 23 in accordance with the control signals received from CCU 50 will be sufficient to induce the desired "mimicking" movement of actuator 24 (which in the scenario illustrated in FIGS. 1 and 2 will be an upward movement as denoted by arrow 24D).

Similarly, the direction, speed, and force of an external force tending inducing movement of rod 27 and piston 28 of actuator 24 in second device 200 will be detected by rod motion sensor 25 and pressure transducer 26 (as denoted by electronic signal arrow 24E), which send corresponding direction, speed, and force data to CCU 50 via data links 4D, 4S, and 4F. This information is processed by CCU 50, which then sends corresponding instruction/control signals to directional control valve 11 and proportional flow control valves 12 and 13 associated with first device 100, which send a "hydraulic instruction/control signal" 14H to actuator 14, causing it to mimic the movement of actuator 24.

Interactive double feedback loops in accordance with the present disclosure can be used in a variety of practical applications. By way of non-limiting example, one device could be provided in the form of a "surrogate mechanical host" (SMH) having a humanoid form with mechanical components and features to provide desired physical dexterity, strength, and durability. In one embodiment, the SMH would be sized and proportioned to match the size and proportion of an "average" human, and would be capable of walking, running, climbing stairs, manually grasping objects, and/or other selected human-like movements. The other (or "master") device would be an apparatus controllable by a human, with sensor and control systems whereby movements of the SMH and forces acting on the SMH would be transmitted to the master device, such that the human operator of the master device would see what the SMH is seeing, hear what the SMH is hearing, and "feel" what the SMH is "feeling" (such as applied forces), all in real time. As well, the movements of the master device would be simultaneously transmitted and imparted to the SMH. To achieve this functionality, the apparatus controlled by the human operator could be in the form of a fully-body suit or partial-body apparatus that is worn by the human operator. In accordance with these operative characteristics, the SMH would be analogous to an "avatar" of the human operator of the master device.

The SMH could be practically any size and strength so long as the two matching actuators have the same function and are proportionate in direction, speed, and force. Thus, for example, the human-controlled (master) device could be 6 feet tall while the SMH (avatar) could be 20 feet tall or 3 feet tall depending on the application. The physical size and strength of the SMH (avatar) can be but is not limited to a one-to-one ratio with the human-controlled master device. For example, a particular application might require a very large and strong SMH—perhaps two or three times the size of an average human, with strength many times that of an average human—such as to help service mining equipment in the field. The actuators within the SMH would, therefore, also need to be proportionately larger, requiring the CCU to compensate for the differences in speed and force between the matching actuators in order to maintain a net shadowing effect.

FIGS. 4A and 4B conceptually illustrate one possible use of devices incorporating interactive double feedback loops in accordance with the present disclosure. FIG. 4A depicts master devices 100A and 100B, and FIG. 4B depicts SMH devices 200A and 200B, which are operatively mated with master devices 100A and 100B, respectively. In other words, FIGS. 4A and 4B show two independent systems: a first system comprising master device 100A and its complementary SMH 200A, and a second system comprising master device 100B and its complementary SMH 200B.

In the illustrated embodiment, master devices 100A and 100B comprise suits that are "wearable" by human operators, with rigid articulating and/or swiveling components corresponding to arms, legs, hands, fingers, etc., as may be necessary to provide a desired range of movements. Each of these essentially rigid suits would incorporate multiple actuators for inducing movements of the articulating and/or swiveling components. As illustrated in a broad conceptual sense in FIG. 4A, master "suit devices" 100A and 100B are mounted in respective mechanized structural frames 110A and 110B such that the entire weight of suit devices 100A and 100B and their human occupants are carried by frames 110A and 110B. In the illustrated embodiment, frames 110A and 110B are adapted to manipulate suit devices 100A and 100B through a range of spatial orientations, with the manipulations performed by frames 110A and 110B being controlled by CCUs 50A and 50B associated with suit devices 100A and 100B. The mechanisms for manipulating frames 110A and 110B are not illustrated, but it will be well within the capabilities of persons skilled in the art to develop suitable mechanisms for this purpose using known technologies.

To minimize the bulk and weight of suit devices 100A and 100B, the associated hydraulic valve and sensor systems associated with the actuators are preferably housed in respective equipment modules 120A and 120B separate from master devices 100A and 100B. CCUs 50A and 50B may also be separately housed, but for illustrative purposes equipment modules 120A and 120B in FIG. 4A may be assumed to house CCUs 50A and 50B as well as the hydraulic valve and sensor systems associated with the various actuators in suit devices 100A and 100B. In FIG. 4A, reference numbers 125A and 125B associated with equipment modules 120A and 120B represent data transceiver means (i.e., apparatus with transmitting and receiving capabilities) for wireless communication with SMHs 200A and 200B. Reference numbers 140A and 140B conceptually represent data cables and hydraulic lines running between suit devices 100A and 100B, via mechanized frames 110A and 110B. Persons skilled in the art will appreciate that there are known ways in which frames 110A and 110B can be designed and built to house cables and hydraulic lines while still being capable of desired ranges and types of mechanical movement without impinging upon the cables and hydraulic lines.

Referring to FIG. 4B, SMHs 200A and 200B are conceptually shown located in a location remote from their corresponding master devices 100A and 100B. Reference numbers 225A and 225B represent transceiver means for wireless communication with transceiver means 125A and 125B associated with equipment modules 120A and 120B. In addition to housing all required actuators, SMHs 200A and 200B in such embodiments would also incorporate all associated hydraulic valve and sensor systems.

SMHs 200A and 200B are shown as being adapted for use in military operations, but this is solely by way of non-limiting example. SMHs can be designed and adapted for many different practical applications. Moreover, SMHs do not necessarily have to be mobile; in alternative embodiments, SMHs can be stationary while being capable of performing various practical tasks. Similarly, human-controlled master devices can be stationary in some applications, whether coupled with mobile SMHs or stationary SMHs.

In many applications, the human-controlled or "master" device will be wired directly to the process and control system, while the SMH (or "avatar") apparatus is wirelessly connected to the same central process and control system (CCU). In other applications, both the human-controlled (master) and avatar (SMH) devices will be wirelessly connected to a common CCU, while in other applications they will both be directly wired to a common CCU. In other words, systems in accordance with the present disclosure could use any combination of wired and/or wireless means providing communication between master and avatar devices and their related CCUs.

"Master/avatar" systems as described above can be used to particular advantage to carry out dangerous operations without risk to human safety. Police work, fire rescue, bomb defusing and disposal operations, manufacturing, equipment maintenance, and exploration work are only a few examples of situations in which such systems can be put to beneficial use, with the avatar or SMH operating in a dangerous environment under the control of a human operating the master device from a safe and perhaps quite remote distance. As previously noted, systems in accordance with the present disclosure could incorporate more than two devices. By way of non-limiting example, one alternative embodiment of the system could involve two or more human "master" devices linked to one SMH, with one of the masters being in the role of teacher or trainer guiding the movements of the one or more other masters being "operated" by trainees to help the trainees learn a physical skill (welding, for example) being performed by the SMH under the operative control of the human-operated master device.

It will be readily appreciated by those skilled in the art that various modifications to embodiments in accordance with the present disclosure may be devised without departing from the scope and teaching of the present teachings, including modifications which may use equivalent structures or materials hereafter conceived or developed. It is to be especially understood that the scope of the claims appended hereto should not be limited by any particular embodiments described and illustrated herein, but should be given the broadest interpretation consistent with the description as a whole. It is also to be understood that the substitution of a variant of a claimed element or feature, without any substantial resultant change in functionality, will not constitute a departure from the scope of the disclosure.

In this patent document, any form of the word "comprise" is to be understood in its non-limiting sense to mean that any item following such word is included, but items not specifically mentioned are not excluded. A reference to an element by the indefinite article "a" does not exclude the possibility that more than one such element is present, unless the context clearly requires that there be one and only one such element. Wherever used herein, any form of the word "typical" is to be understood in the sense of representative or common usage or practice, and not as implying invariability or essentiality.

The embodiments of the invention in which an exclusive property or privilege is claimed are defined as follows:

1. An electro-hydraulic circuit comprising:
   (a) a first actuator and a second actuator;
   (b) a first sensor system and a second sensor system, said first and second sensor systems being associated, respectively, with the first and second actuators;
   (c) a first hydraulic valve system and a second hydraulic valve system, said first and second hydraulic valve systems being associated, respectively, with the first and second actuators; and
   (d) a central control unit in two-way electronic communication with the first actuator and with the second actuator;
   wherein:
   (e) each sensor system is adapted to gather data relating to movements of its associated actuator, and to transmit corresponding electronic data to the central control unit;
   (f) each valve system is adapted to initiate movements of its associated actuator, in accordance with control signals received from the central control unit; and
   (g) the central control unit is adapted to generate and send control signals to the first valve system in response to which the first actuator will mimic, in close to real time, movements of the second actuator; and to generate and send control signals to the second valve system in response to which the second actuator will mimic, in close to real time, movements of the first actuator;
   such that the movements of each actuator will be in proportionate correspondence to the movements of the other actuator.

2. An electro-hydraulic circuit as in claim 1 wherein the movements of the first actuator will be proportionate to the movements of the second actuator at a one-to-one ratio.

3. An electro-hydraulic circuit as in claim 1 wherein the data gathered by each sensor system includes data relating to the direction, speed, and force of movements of the associated actuator.

4. An electro-hydraulic circuit as in claim 3 wherein each hydraulic valve system comprises:
   (a) a directional control valve, for governing the direction of movement of the associated actuator;
   (b) a first proportional flow control valve, for governing the speed of movement of the associated actuator; and
   (c) a second proportional flow control valve, for governing the force developed by the associated actuator.

5. An electro-hydraulic circuit as in claim 1 wherein each actuator comprises a hydraulic cylinder.

6. An electro-hydraulic circuit as in claim 5 wherein each hydraulic cylinder is a double-rod, double-acting hydraulic cylinder.

7. An electro-hydraulic circuit as in claim 5 wherein each sensor system comprises a rod motion sensor and a hydraulic pressure sensor.

8. A mechanical apparatus comprising a first device, a second device, and an electro-hydraulic circuit, said electro-hydraulic circuit comprising:
   (a) a first actuator and a second actuator;
   (b) a first sensor system and a second sensor system, said first and second sensor systems being associated, respectively, with the first and second actuators;
   (c) a first hydraulic valve system and a second hydraulic valve system, said first and second hydraulic valve systems being associated, respectively, with the first and second actuators; and
   (d) a central control unit in two-way electronic communication with the first actuator and with the second actuator;
   wherein:
   (e) each sensor system is adapted to gather data relating to movements of its associated actuator, and to transmit corresponding electronic data to the central control unit;
   (f) each valve system is adapted to initiate movements of its associated actuator, in accordance with control signals received from the central control unit;
   (g) the central control unit is adapted to generate and send control signals to the first valve system in response to which the first actuator will mimic, in close to real time, movements of the second actuator; and to generate and send control signals to the second valve system in response to which the second actuator will mimic, in close to real time, movements of the first actuator, such that the movements of each actuator will be in proportionate correspondence to the movements of the other actuator;
   (h) the first actuator is incorporated into the first device and is operatively connected to a movable component of the first device; and
   (i) the second actuator is incorporated into the second device and is operatively connected to a movable component of the second device.

9. A mechanical apparatus as in claim 8 wherein the first device is controllable by a human operator.

10. A mechanical apparatus as in claim 9 wherein the first device comprises an apparatus that is wearable by a human operator.

11. A mechanical apparatus as in claim 8 wherein at least one of the first and second devices is movable in at least one spatial direction.

12. A mechanical apparatus as in claim 8 wherein at least one of the first and second devices is stationary.

13. A mechanical apparatus as in claim 8 wherein the mechanical apparatus comprises at least one additional electro-hydraulic circuit (EHC), wherein each additional EHC comprises:
   (a) a first actuator and a second actuator;
   (b) a first sensor system and a second sensor system, said first and second sensor systems being associated, respectively, with said first and second actuators of the additional EHC;
   (c) a first hydraulic valve system and a second hydraulic valve system, said first and second hydraulic valve systems of the additional EHC being associated, respectively, with the first actuator and the second actuator of the additional EHC; and (d) a central control unit in two-way electronic communication with the first and second actuators of the additional EHC;

wherein:

(e) each sensor system of each additional EHC is adapted to gather data relating to movements of its associated actuator, and to transmit corresponding electronic data to the central control unit of the associated additional EHC;

(f) each valve system of each additional EHC is adapted to initiate movements of its associated actuator, in accordance with control signals received from the central control unit of the associated additional EHC;

(g) the central control unit of each additional EHC is adapted:

to generate and send control signals to the first valve system of the associated additional EHC, in response to which the first actuator of the associated additional EHC will mimic, in close to real time, movements of the second actuator of the associated additional EHC; and to generate and send control signals to the second valve system of the associated additional EHC, in response to which the second actuator of the associated additional EHC will mimic, in close to real time, movements of the first actuator of the associated additional EHC;

such that the movements of each actuator of each additional EHC will be in proportionate correspondence to the movements of the other actuator of the associated additional EHC;

(h) the first actuator of each additional EHC is incorporated into the first device and is operatively connected to a movable component of the first device; and (i) the second actuator of each additional EHC is incorporated into the second device and is operatively connected to a movable component of the second device.

* * * * *